DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 24, 1973

912 O.G. 1232

T912,011

SMOKING PRODUCT

John A. Harpham, Carrcroft, and Eugene D. Klug, Hillcrest, Del., assignors to Hercules Incorporated, Wilmington, Del.

Filed June 30, 1972, Ser. No. 267,801

Int. Cl. A24b *3/00, 3/14*

U.S. Cl. 131—2

No Drawing. 8 Pages Specification

A smoking product is prepared by thermoforming a mixture of hydroxypropyl cellulose, an inorganic ashing material, and, optionally, an organic filler. The hydroxypropyl cellulose can be plain hydroxpropyl cellulose or a modification thereof such as benzyl-, phenylhydroxyethyl-, or hydroxybutyl hydroxypropyl cellulose which would have a lower cloud point and thus be less moisture sensitive. Optionally the hydroxypropyl cellulose can be foamed slightly to modify the combustion characteristics thereof. The inorganic material is preferably an alkali or alkaline earth metal compound in particulate form from about 25 to 200 mesh. The optional organic filler is a physiologically inert, combustible material which modifies the combustion characteristics of the hydroxypropyl cellulose.